United States Patent
Cook

(10) Patent No.: US 7,269,318 B2
(45) Date of Patent: Sep. 11, 2007

(54) IN-COLOR FIBER OPTIC CABLE IDENTIFICATION METHOD

(75) Inventor: Thomas Christopher Cook, Woodstock, GA (US)

(73) Assignee: Superior Essex Communications, LP, Atlanta, GA (US)

(*) Notice: Subject to any disclaimer, the term of this patent is extended or adjusted under 35 U.S.C. 154(b) by 35 days.

(21) Appl. No.: 10/806,586

(22) Filed: Mar. 23, 2004

(65) Prior Publication Data

US 2005/0213901 A1    Sep. 29, 2005

(51) Int. Cl.
*G02B 6/44*    (2006.01)
(52) U.S. Cl. ............. 385/100; 385/102; 385/106; 385/109; 385/112
(58) Field of Classification Search ........ 385/100, 385/102, 106, 109, 112
See application file for complete search history.

(56) References Cited

U.S. PATENT DOCUMENTS

| | | | | |
|---|---|---|---|---|
| 4,898,451 | A | * | 2/1990 | Story .................... 385/106 |
| 5,345,526 | A | * | 9/1994 | Blew .................... 385/112 |
| 6,208,790 | B1 | * | 3/2001 | Zopf et al. ............. 385/128 |
| 6,215,932 | B1 | | 4/2001 | Hardwick, III et al. |
| 6,317,542 | B1 | | 11/2001 | Hardwick, III et al. |
| 6,321,012 | B1 | | 11/2001 | Shen |
| 6,374,023 | B1 | | 4/2002 | Parris |
| 6,404,962 | B1 | | 6/2002 | Hardwick, III et al. |
| 6,421,486 | B1 | * | 7/2002 | Daneshvar et al. ....... 385/109 |
| 6,584,257 | B1 | | 6/2003 | Hurley et al. |
| 6,661,956 | B2 | * | 12/2003 | Yamasaki et al. ........ 385/109 |

* cited by examiner

*Primary Examiner*—Frank G. Font
*Assistant Examiner*—Jerry Martin Blevins
(74) *Attorney, Agent, or Firm*—King & Spalding

(57) ABSTRACT

Herein described is a method and system for identifying buffer tubes in a cable by including at least one colored filling material within a transparent or translucent buffer tube.

14 Claims, 3 Drawing Sheets

IN-COLOR FIBER OPTIC CABLE IDENTIFICATION METHOD

FIELD OF THE INVENTION

This invention relates to a communications cable. Particularly, this invention relates to fiber optic cable. More particularly, this invention relates to a method for identifying optical fibers and buffer tubes in a cable.

BACKGROUND

Optical fiber cables have been a very popular medium for communications and data transmission due to their high speeds and suitability over long distances. The transmission medium of optical fiber cables consist of thin optical fibers protected from external forces and elements by precisely designed and manufactured cable structures. One common cable structure used is the loose-tube cable. The loose-tube cable contains one or more buffer tubes arranged around a central strength member. The buffer tubes loosely encase one or more optical fibers, either in bundles or ribbons, thereby providing sufficient room for the fiber(s) to move within the buffer tube in response to applied stresses. The space inside the buffer tubes between the fibers and the buffer tube is filled with a waterblocking filling material to protect the fibers from water penetration. The buffer tubes can then be wrapped with binders, tapes, or yarns to provide additional strength and protection. Finally, the cable assembly is encased within a cable jacket to provide mechanical strength and protection from the environment.

The loose-tube cable design permits easy drop-off of groups of fibers at intermediate points without interfering with other buffer tubes being routed to other locations. Since not all fibers, or groups of fibers, will always be routed to the same location or terminal application, it is necessary to be able to identify and distinguish among the various groups of fibers and among individual fibers. Because of the vast quantity of optical fibers that may be contained in an optical fiber cable, a color coding scheme is most commonly used to identify the buffer tubes and the individual optical fibers therein. This color-coding scheme generally consists of color-coding the buffer tubes and individual fibers. Usually the color-coding complies with EIA/TIA-598 color specifications.

Traditionally, individually colored buffer tubes are produced by adding and mixing a colorant in an extruder or other high pressure mixing device prior to extrusion of each individual tube. Coloring buffer tubes requires mixing the buffer tube material with a color concentrate, or colorant, in an extruder or other high temperature and high pressure mixing device prior to extrusion each time a different tube color is desired. This results in substantial delays and down times just to change the tube color. Tube colorants can also be quite expensive. These colorants typically contain a pigment, dye or other coloring concentrate carried in a base resin. The buffer tube material and the base resin for the color concentrate should be the same type of material because of material incompatibility. Since the buffer tube material generally comprises polybutylene terephthalate (PBT), polyester elastomer, nylon, fluoropolymer, acetal resin or polycarbonate, the colorants that can be used become quite expensive.

Finally, color-coding buffer tubes is not suitable for cables having a high number of buffer tubes. The buffer tubes of cables having more than twelve buffer tubes are marked by the placement of rings, bands, stripes or identification threads/tapes around or in the buffer tubes. These cables are expensive to produce, and require cutting away substantial portions of the outer jacket to locate any such marking.

SUMMARY

This specification describes a method and system for identifying buffer tubes in a cable by including at least one colored filling material within a transparent or translucent buffer tube.

BRIEF DESCRIPTION OF THE DRAWINGS

The products and processes described herein will be understood in light of the drawings, wherein:

FIGS. 1-5 illustrate specific aspects of the products and processes described in the present specification and constitute a part of the specification. Together with the following description, the Figures demonstrate and explain the principles of the products and processes of the present invention.

DETAILED DESCRIPTION

The following description includes specific details in order to provide a thorough understanding of the novel cable and buffer tube and fiber identification and management system. The skilled artisan will understand, however, that the products and methods described below can be practiced without employing these specific details. Indeed, they can be modified and can be used in conjunction with products and techniques known to those of skill in the art. For example, this specification describes the novel cable and identification system with respect to loose-tube cables. The principles taught herein, however, may be applied to other types of cables, such as optical fiber ribbon cables, or any cable or device employing a filling material.

It should be understood that the term "different color," as used in the present specification and appended claims, refers to a color or shade of a color that is visually distinguishable from another color or shade of a color, unless otherwise noted. The term "same color" refers to colors or shades of a color that are visually indistinguishable, unless otherwise noted.

This specification describes a fiber optic cable and a method of manufacture that makes use of a colored filling material injected into a translucent or transparent fiber buffer tube or tubes. This allows for the identification of fiber optic buffer tubes and management of the individual fibers without coloring the buffer tube itself. This fiber optic cable is created by mixing a colorant into the filling material just prior to its injection into the buffer tube. The process eliminates the need for tube coloring and allows the use of less expensive and more manufacturing-friendly color concentrates that are mixed into the filling material itself, not the buffer tube material. The colored filling material can be visible through the translucent or transparent fiber buffer tube material, thus allowing identification and classification of the various buffer tubes within the cable.

In loose-tube cables the individual fibers are typically grouped into groups of six or twelve fibers, and each group is placed inside a buffer tube, separate from fibers in other buffer tubes. The filling material contained within a buffer tube serves a variety of functions. For example, the filling material inhibits water migration into the tube, and protects the fiber(s) within the tube from water absorption. The filling material that may be used includes any filling material known to those skilled in the art, such as gels, greases, petroleum jelly compounds, oils, and the like.

Figure 1:
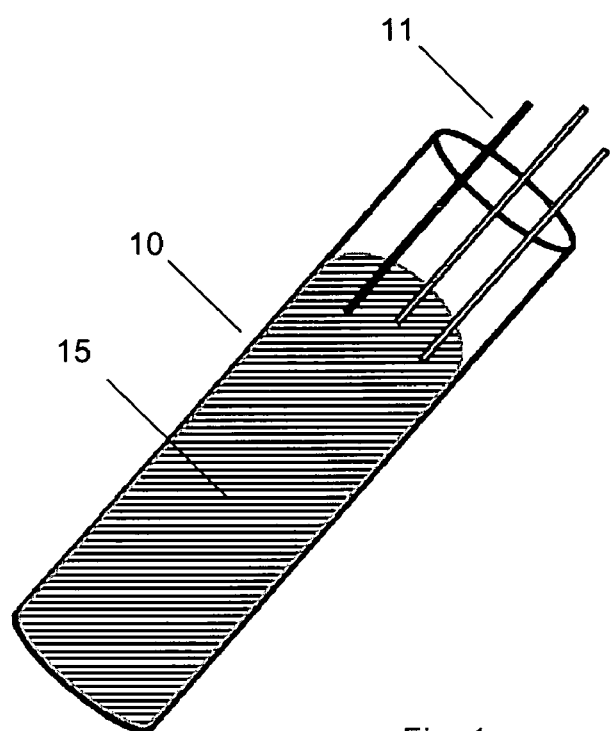
FIG. 1 illustrates a perspective side view of a buffer tube in an embodiment of the invention.
Figure 2:
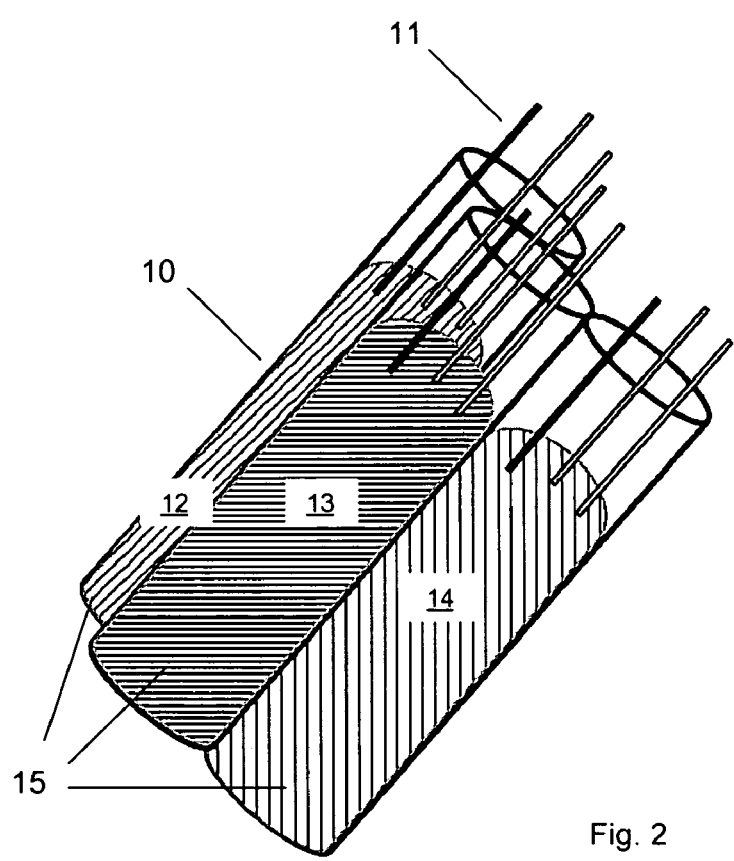
FIGS. 2-5 illustrate perspective side views of a group of buffer tubes in various embodiments of the invention.

As shown in FIG. 1, the novel optical fiber cable generally includes a colored filling material (15) disposed within at least one buffer tube (10). A buffer tube (10) may contain one or more optical fibers (11), each of which may be a different color from the other fibers (11) within the same buffer tube (10). FIG. 2 depicts multiple buffer tubes (10) of a single cable that are identified and distinguished by the color of the filling material (15) within each buffer tube (10). The filling material (15) provides a means for identifying and distinguishing the buffer tube (10) in which the filling material (15) is disposed from other buffer tubes within the same cable. This is done by color-coding the filling material (15) within the buffer tubes (10) of a cable. In an exemplary embodiment, filling material (12) may be blue, filling material (13) may be orange, and filling material (14) may be green.

In an embodiment, the color-coding scheme complies with EIA/TIA-598 color specifications, which are incorporated herein by reference. According to these specifications, the filling material used within buffer tubes may be one of twelve colors: blue, orange, green, brown, slate, white, red, black, yellow, purple, rose, or aqua. The fibers within these buffer tubes may also be color-coded, typically according to EIA/TIA-598 specifications. Thus, a cable may contain up to twelve buffer tubes, each containing filling material of a different color. In another embodiment, each tube contains up to twelve differently colored individual fibers. Other color-coding schemes besides EIA/TIA-598 may also be followed, according to the desired application or other applicable rules and standards. Generally, though, no two buffer tubes of the same color will contain filling material of the same color. While most cables typically contain six or twelve optical fibers in each buffer tube, the cable described herein also contemplates buffer tubes having more or fewer fibers in each buffer tube.

The filling material is colored by adding and mixing a colorant, such as a dye or pigment, into the filling material prior to its injection into a buffer tube. This process provides significant savings in money and processing time. The colorants for filling material are cheaper and easier to use because they do not require an expensive base resin, unlike the colorants used in prior art buffer tube materials.

Suitable dyes that may be used include, but are not limited to, azo dyes, diazodyes, pyrazolones, quinolones, quinophthalones, anthraquinones and nigrosines. Useful pigments include any substance that imparts a desired color to the filling material. Suitable pigments include, but are not limited to, organic pigments such as benzimidazolones (yellow, red, orange), phthalocyanimes (blue, green), quinacsidones (violet, red, orange), dioxanes (violet), isoindolinones (yellow, red, orange), disazos (yellow, red), pyrazalones (orange, red), diarylides (yellow, orange), dianisidines (orange); inorganic pigments such as titanium dioxide (white), lead chromates (yellow, orange), iron oxides (brown, red, maroon, yellow, black), chromium oxide (green), cadmium sulfoselenides (maroon, red, orange), lithopone (white), ultramarine blue (aluminosilicate complex with sulfur), nickel titanate (yellow), cobalt aluminate (blue), zinc chromate (yellow), lead molybdate (orange), cadmium sulfide (orange); lake pigments; pearlescent colorants; and daylight fluorescent colorants.

Using color-coded fibers and color-coded filling material thus provides a two-level buffer tube and fiber identification and management system for optical fiber cables. The buffer tubes in such a two-level fiber identification and management system may consist of any one color. In an embodiment, as shown in FIG. 2, the buffer tubes (10) are transparent or translucent. Such buffer tubes (10) are identified and distinguished by the color of the filling material (15) within each buffer tube (10), rather than by the color of the buffer tube (10) itself. Suitable buffer tube materials that may be used include, but are not limited to, polyethylene, polypropylene, polybutylene terephthalate (PBT), polyamide, polyester elastomer, nylon, fluoropolymer, acetal resin, polycarbonate, a layered combination, and the like.

Transparent or translucent buffer tubes provide significant advantages and benefits to colored buffer tubes. They significantly decrease costs of making the buffer tubes, and since they are not colored they eliminate the need for expensive colorants having a base resin made from the buffer tube material. Also, producing transparent or translucent buffer tubes requires the use of only one buffer tube material, thereby eliminating the step of changing and mixing the colorant. This substantially decreases the processing time and associated costs.

Figure 3:
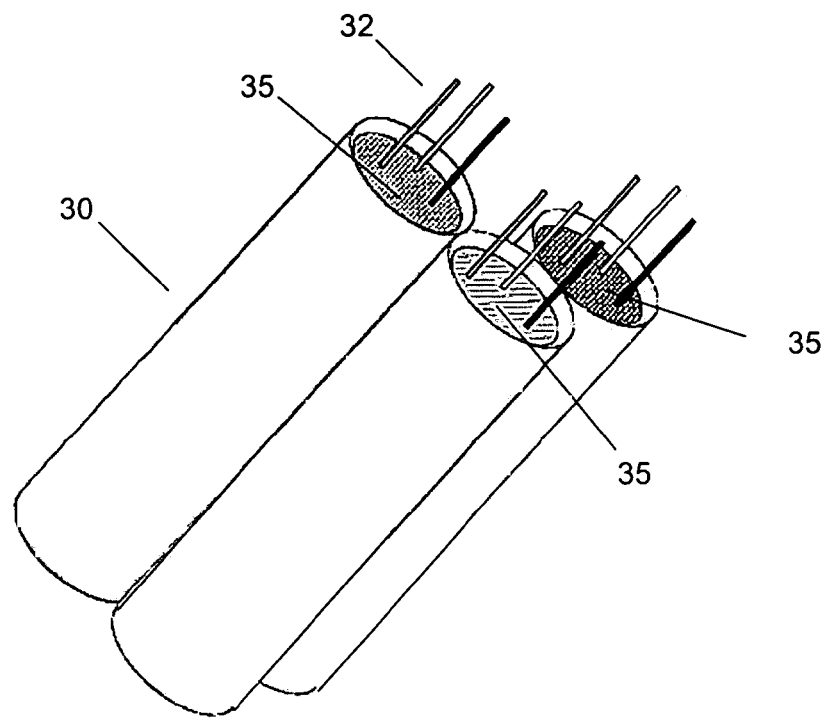

The buffer tubes may also be color-coded, and need not be transparent or translucent, as shown in FIG. 3. An optical fiber cable containing color-coded buffer tubes (30) in conjunction with color-coded filling material (35) and color-coded optical fibers (32) provides a three-level system for identifying and managing the optical fibers (32) within a cable. Such a system has several advantages. First, it permits construction of a cable with a very high number of fibers (32) while allowing identification of any individual fiber (32) within the cable. Second, buffer tubes (30) are identified by the color of the buffer tube (30) and filling material (35), rather than by rings, bands, stripes or identification threads/tapes as used in prior art cables. According to an embodiment of the identification method described herein, access to the cable may be sped up due to the ability to identify tubes and/or fibers more quickly.

Figure 4:
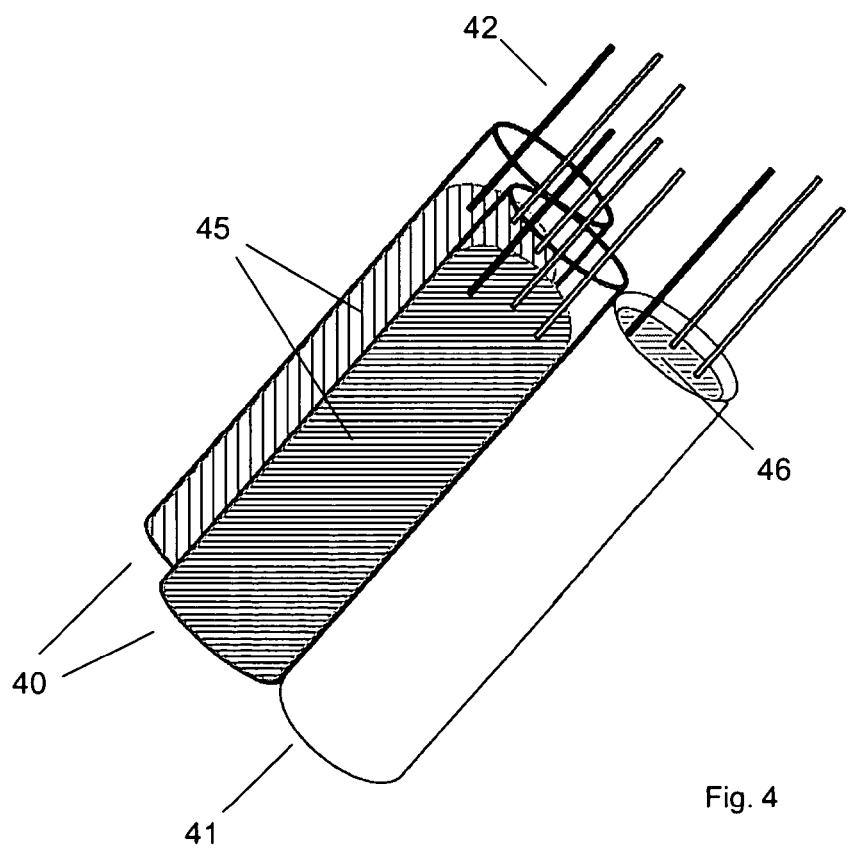

To provide additional methods and systems of identifying and managing optical fibers in a cable, different combinations of color-coded buffer tubes and color-coded filling material may be used. FIG. 4 shows an embodiment in which the novel fiber optic cable comprises both transparent or translucent buffer tubes (40) having color-coded filler material (45) and color-coded buffer tubes (41) having non-color-coded filler material (46). According to this embodiment, a cable following the EIA/TIA-598 color specifications can have up to twelve color-coded buffer tubes (41), and up to twelve transparent or translucent buffer tubes (40) identified by the color of the filling material (45), for a total of twenty-four visually distinguishable and identifiable buffer tubes. Each buffer tube (40, 41) may have up to twelve color-coded fibers (42), thereby allowing the cable to have up to 288 individually identifiable fibers.

Figure 5:
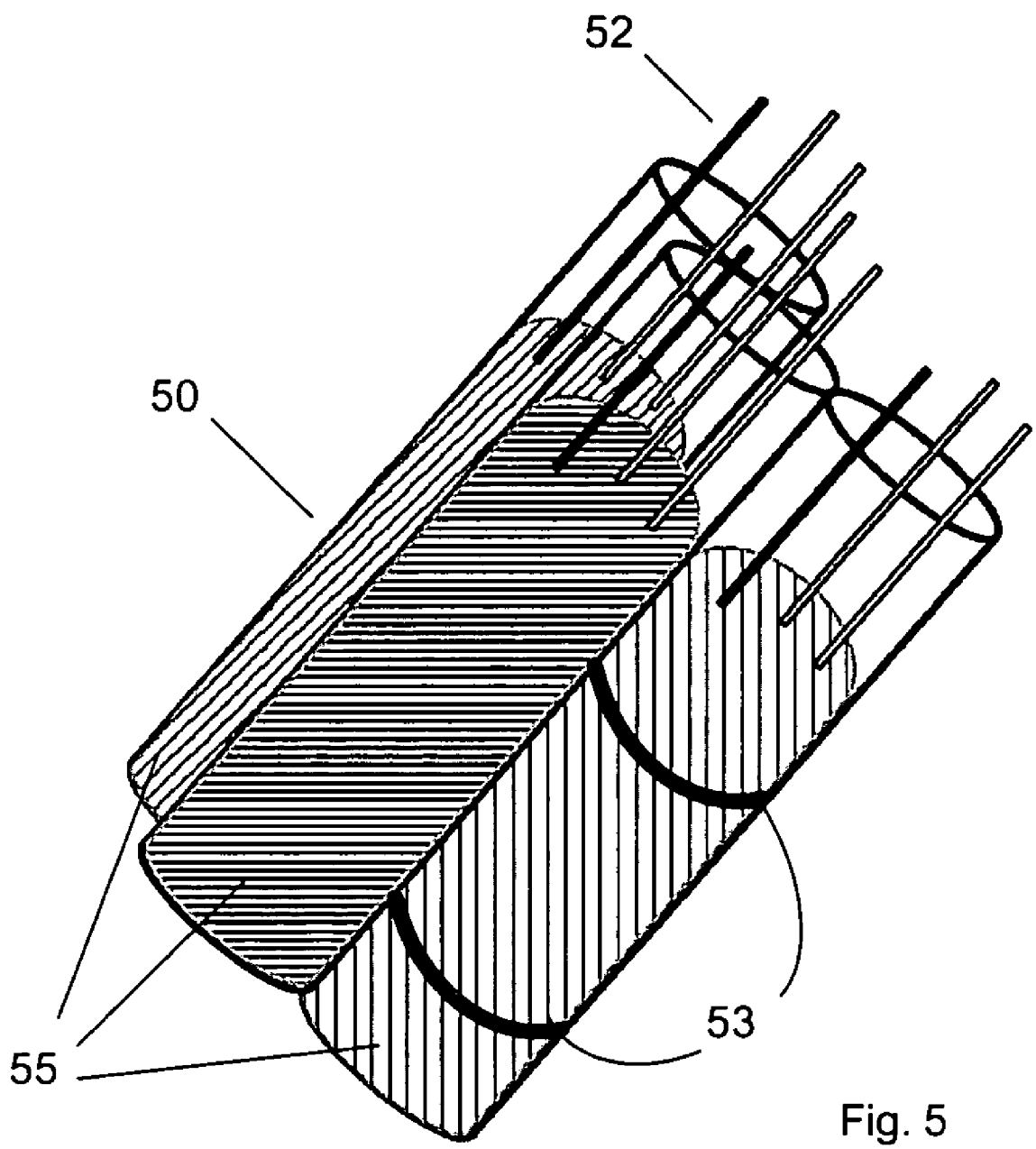

Furthermore, other techniques known to those in the art may be used in combination with the principles described herein. For example, a third-level of identification of buffer tubes can be achieved by using ring or band markings around one or more buffer tubes at various or regular intervals, in addition to using color-coded filling material and color-coded fibers. This can be suitable for cables having high numbers of buffer tubes. FIG. 5 depicts an embodiment in which the cable has only transparent or translucent buffer tubes (50), and contains color-coded filling material (55) and color-coded optical fibers (52). At least one of the buffer tubes (50) has rings (53) to distinguish the buffer tube from other buffer tubes in the same cable. Thus, a cable complying with EIA/TIA-598 may contain more than twelve individually identifiable buffer tubes. In another embodiment, such a system may also include color-coded buffer tubes in addition to transparent or translucent buffer tubes.

The cable of the present invention is made in a manner that substantially decreases the time and costs associated with processing buffer tubes and fiber optic cables. Generally, the filler material colorant is mixed into the filler material prior to injection of the filler material into the buffer tubes to create a colored filler material. The buffer tubes can then be extruded around the optical fibers. In an embodiment, the buffer tube material contains no added colorants, thereby creating a transparent or translucent buffer tube when extruded. The steps of adding and mixing colorant into the buffer tube material, and then changing the buffer tube material for a subsequent tube extrusion, can be eliminated, increasing the processing time. In another embodiment, the buffer tube material is also colored by adding and mixing a tube colorant to the buffer tube material prior to extrusion. The buffer tube is extruded around the fibers while the colored filler material is injected into the buffer tubes. Those skilled in the art will recognize that methods other than those described above, but known to those of skill in the art, may also be employed to make transparent or translucent, or colored buffer tubes.

The novel cable can also include other components to provide additional strength, protection, durability, and other desirable properties. For example, the cable may include yarns, tapes, binders, armors, shields, flooding material, strength members, jackets and other cable components known to those of skill in the art.

The preceding description has been presented only to illustrate and describe exemplary embodiments of the novel cable and buffer tube and fiber identification and management system. It is not intended to be exhaustive or to limit the products and processes to any precise form disclosed. Many modifications and variations are possible in light of the above teaching. It is intended that the scope of the products and processes be defined by the following claims.

What is claimed is:

1. A cable, comprising:
a plurality of color-coded buffer tubes providing a first level of color-coded identification;
color-coded filling material, disposed in each of the color-coded buffer tubes, providing a second level of color-coded identification; and
a plurality of color-coded optical fibers, disposed in each of the color-coded buffer tubes, providing a third level of color-coded identification,
wherein the color-coded filling material is a color-coded gel, and the color-coded gel comprises a fluorescent colorant.

2. A cable, comprising:
a plurality of color-coded buffer tubes providing a first level of color-coded identification;
color-coded filling material, disposed in each of the color-coded buffer tubes, providing a second level of color-coded identification; and
a plurality of color-coded optical fibers, disposed in each of the color-coded buffer tubes, providing a third level of color-coded identification,
wherein each optical fiber in the plurality of color-coded fibers is individually identifiable based on a unique three-dimensional color-code defined by color of the each optical fiber, color of the buffer tube in which the each optical fiber is disposed, and color of the filling material of the buffer tube in which the each optical fiber is disposed,
wherein at least two buffer tubes in the plurality of color-coded buffer tubes have a common color,
wherein at least two buffer tubes in the plurality of color-coded buffer tubes are filled with color-coded filling materials that have a common color, and
wherein at least two color-coded optical fibers in plurality of color-coded fibers have a common color.

3. A cable, comprising:
a plurality of transparent or translucent buffer tubes, each comprising circumscribing identifier marks attached thereto at regular length intervals;
a plurality of color-coded optical fibers within each buffer tube of said plurality of transparent or translucent buffer tubes; and
color-coded filling material disposed within each buffer tube of said plurality of transparent or translucent buffer tubes,
wherein each of the color-coded optical fibers is uniquely identifiable based on a three-dimensional code defined by an identifier mark attached to the buffer tubes, a color of each optical fiber, and a color of the filling material,
wherein at least two buffer tubes in the plurality of transparent or translucent buffer tubes have common identifier marks,
wherein at least two buffer tubes in the plurality of transparent or translucent buffer tubes are filled with color-coded filling materials that have a common color, and
wherein at least two color-coded optical fibers in the plurality of color-coded fibers have a common color.

4. A system for identifying buffer tubes, comprising:
a plurality of transparent or translucent buffer tubes, each having an inner wall circumferentially surrounding a respective set of optical fibers;
at regular length intervals, identifying band markings attached to and circumscribing at least one transparent or translucent buffer tube of said plurality of transparent or translucent buffer tubes;
a plurality of color-coded buffer tubes;
non-color-coded filling material disposed within said color-coded buffer tubes; and
gelatinous color-coded filling material disposed within said transparent or translucent buffer tubes, wherein each of the buffer tubes is uniquely identifiable based on a three-dimensional code defined by identifying bank markings attached to the buffer tubes, color of the buffer tubes, and color of the filling material,
wherein at least two buffer tube have common identifying band markings,
wherein at least two buffer tube have a common color code, and
wherein at least two buffer tubes are filled with color-coded filling materials that have a common color.

5. A system for identifying optical fibers, comprising:
a plurality of transparent or translucent buffer tubes providing an internal volume;
color-coded optical fibers occupying a portion of the internal volume; and
color-coded gelatinous filling material disposed within each of said buffer tubes, wherein each buffer tube contains a different color of filling material, and wherein the color-coded fibers and the color-coded gelatinous filling material occupy essentially all of the internal volume, and wherein the gelatinous filling material comprises one of pythalocyanime, azo dye, chromium oxide, lake pigment, guinolone, and lithopone.

6. A system for identifying optical fibers, comprising:
a plurality of transparent or translucent buffer tubes providing an internal volume;
color-coded optical fibers occupying a portion of the internal volume; and
color-coded gelatinous filling material disposed within each of said buffer tubes, wherein each buffer tube contains a different color of filling material, and wherein the color-coded fibers and the color-coded gelatinous filling material occupy essentially all of the internal volume,
wherein the gelatinous filling material comprises a pearlescent colorant.

7. A method for identifying or managing optical fibers in a cable, comprising:
color-coding optical fibers;
color-coding gelatinous filling material;
color-coding buffer tubes;
including the optical fibers and the filling material within the buffer tubes;
establishing a three-dimensional code, for uniquely identifying each respective optical fiber of the optical fibers, each respective optical fiber defined by a color of the optical fiber, a color of the buffer tube in which the optical fiber is disposed, and a color of the filling material within the buffer tube in which the optical fiber is disposed,
wherein at least two buffer tubes have a common color,
wherein at least two buffer are filled with filling materials having a common color, and
wherein at least two optical fibers have a common color.

8. A cable, comprising:
a plurality of transparent or translucent buffer tubes, each comprising circumscribing identifier marks attached thereto at regular length intervals;
a plurality of color-coded optical fibers within each buffer tube of said plurality of transparent or translucent buffer tubes; and
color-coded filling material disposed within each buffer tube of said plurality of transparent or translucent buffer tubes, wherein a combination of filling material color, optical fiber color, and the circumscribing identifier marks uniquely identifies each optical fiber in the cable,
wherein the color-coded filling material of least three buffer tubes in said plurality of transparent or translucent buffer tubes have a common color,
wherein at least three buffer tubes in said plurality of transparent or translucent buffer tubes have a common marking code,
wherein at least three color-coded optical fibers in the cable have a common color, and
wherein the color-coded filling material is gelatinous.

9. The system of claim 5, wherein the gelatinous filling material comprises pythalocyanime.

10. The system of claim 5, wherein the gelatinous filling material comprises azo dye.

11. The system of claim 5, wherein the gelatinous filling material comprises chromium oxide.

12. The system of claim 5, wherein the gelatinous filling material comprises lake pigment.

13. The system of claim 5, wherein the gelatinous filling material comprises quinolone.

14. The system of claim 5, wherein the gelatinous filling material comprises lithopone.

* * * * *

UNITED STATES PATENT AND TRADEMARK OFFICE
CERTIFICATE OF CORRECTION

| | | |
|---|---|---|
| PATENT NO. | : 7,269,318 B2 | |
| APPLICATION NO. | : 10/806586 | |
| DATED | : September 11, 2007 | |
| INVENTOR(S) | : Thomas Christopher Cook | |

It is certified that error appears in the above-identified patent and that said Letters Patent is hereby corrected as shown below:

Claim 5, column 7, line 4, "guinolone" should read --quinolone--.

Signed and Sealed this

Fourth Day of December, 2007

JON W. DUDAS
*Director of the United States Patent and Trademark Office*